Jan. 6, 1959　　　G. R. BROWNLEE ET AL　　　2,867,340
BALE WAGONS
Filed Oct. 7, 1957　　　　　　　　　　　　　3 Sheets-Sheet 1
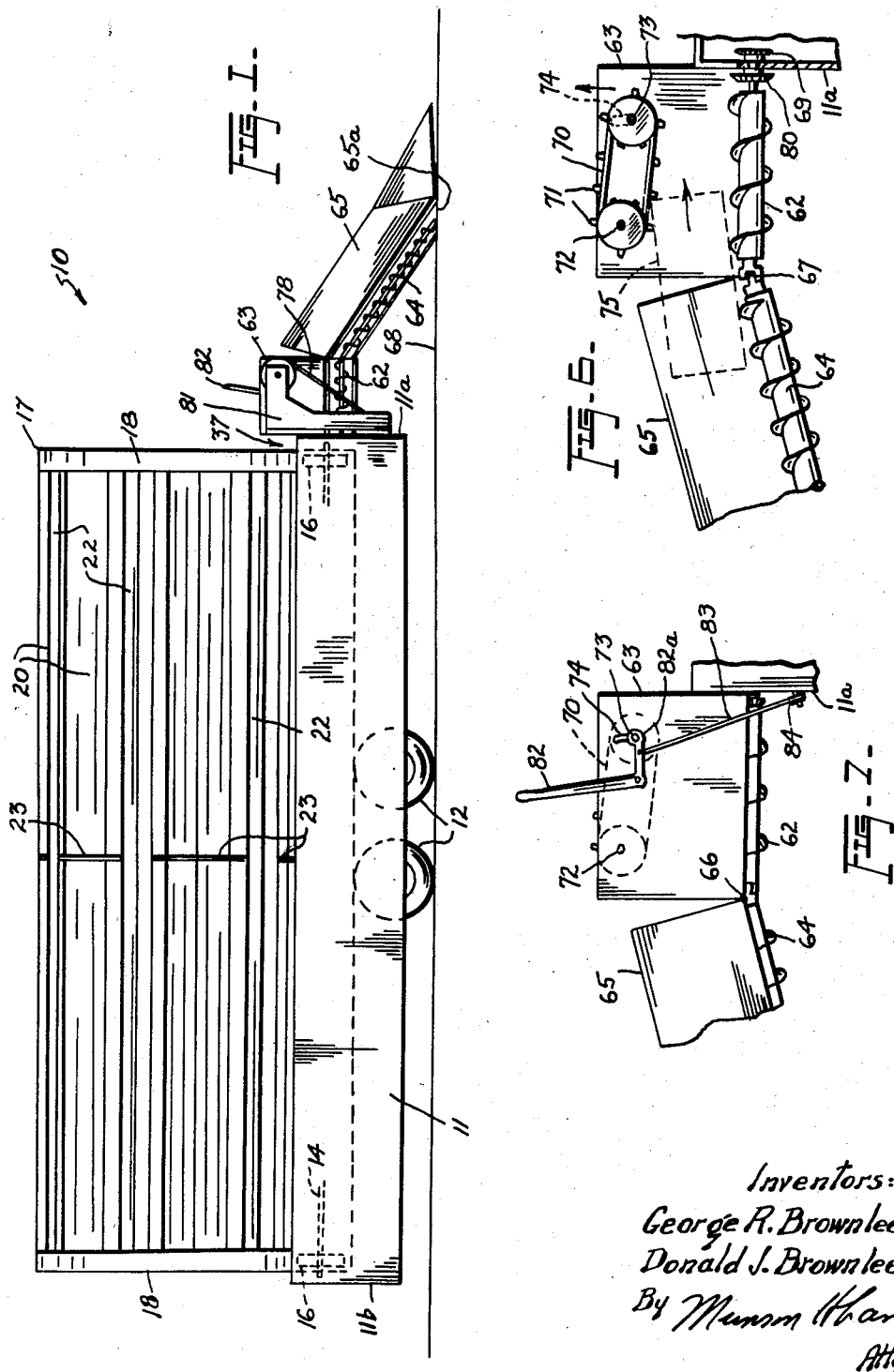
Inventors:
George R. Brownlee
Donald J. Brownlee
By Munson Hare
Atty.

Jan. 6, 1959 G. R. BROWNLEE ET AL 2,867,340
BALE WAGONS
Filed Oct. 7, 1957 3 Sheets-Sheet 2
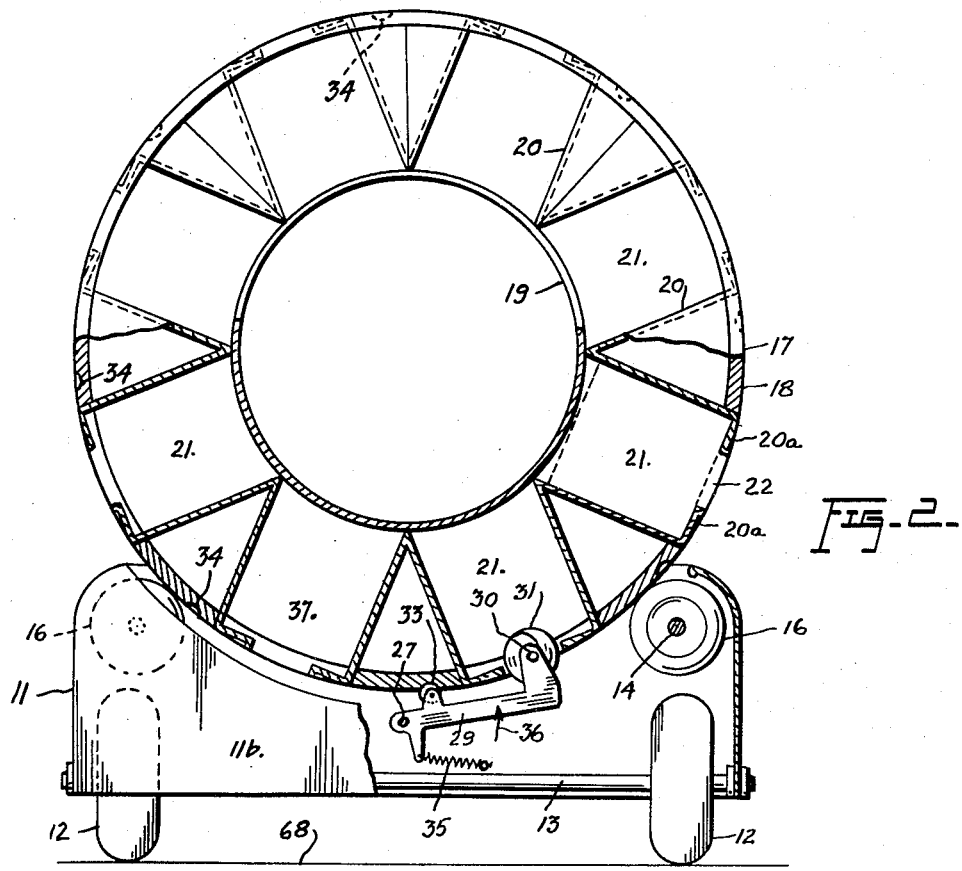
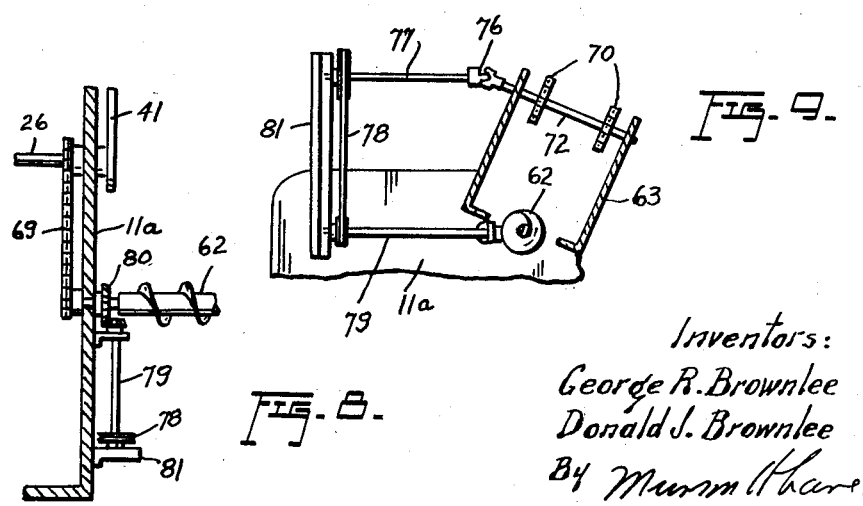
Inventors:
George R. Brownlee
Donald J. Brownlee
By
Atty.

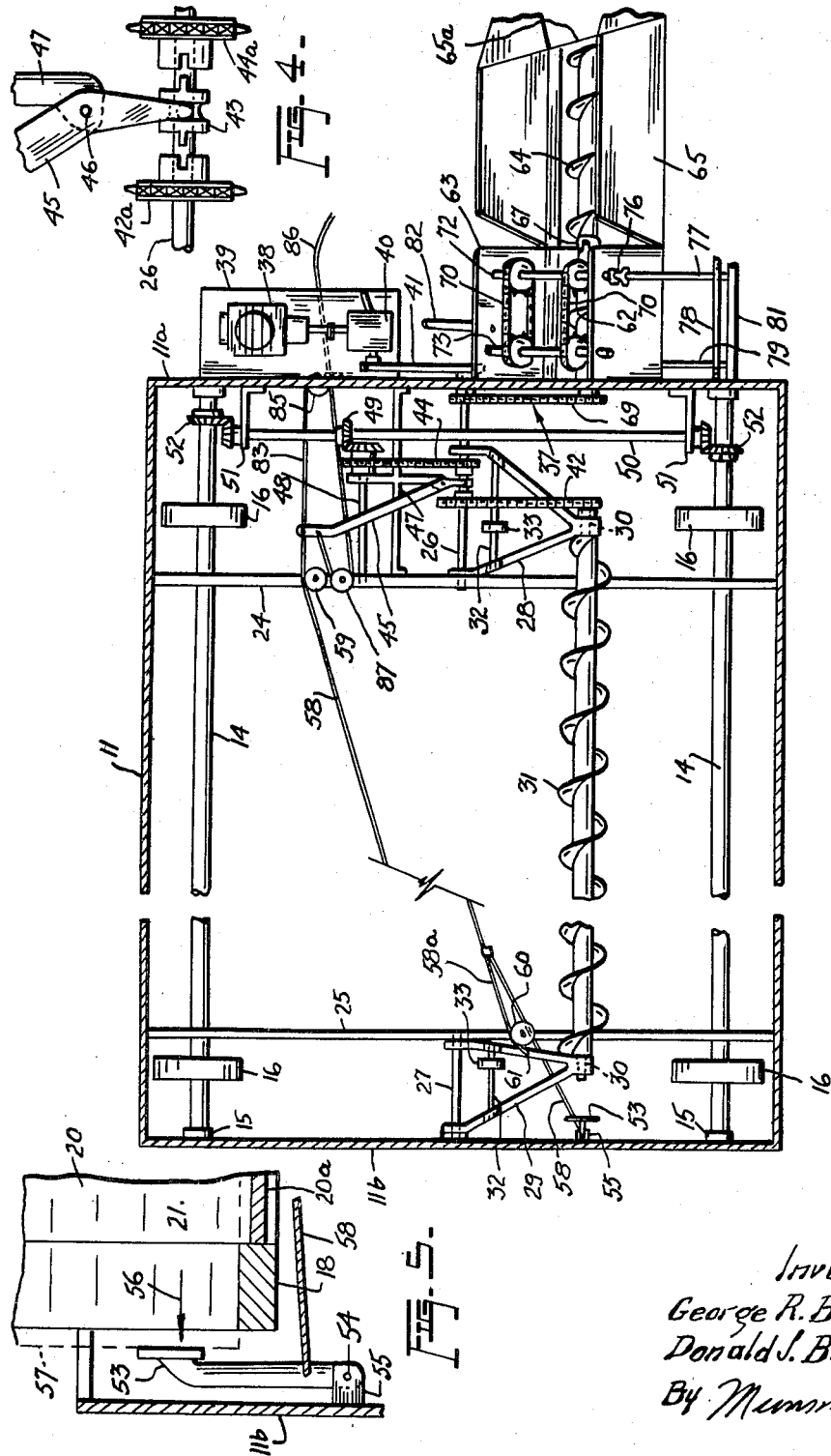

2,867,340

BALE WAGONS

George R. Brownlee and Donald J. Brownlee,
Sylvia, Kans.

Application October 7, 1957, Serial No. 688,455

6 Claims. (Cl. 214—521)

This invention relates to new and useful improvements in self-loading and unloading bale wagons, and in particular the invention concerns itself with wagons for transporting bales of hay, straw, or the like, of the general type disclosed in our Patent No. 2,761,578 issued September 4, 1956, and Patent No. 2,784,859 issued March 12, 1957.

The principal object of the present invention is to provide an improved bale wagon having conveyor means for positively moving bales in and out of the compartments of the drum of the wagon, and additional conveyor means for moving bales to and from the loading and unloading station of the drum, the operation of the conveyors being coordinated with means for rotating the drum so that bales may be loaded into and unloaded from the wagon in an efficient, fully automatic manner.

Other objects and features of the present invention will be understood from the following description taken in conjunction with the accompanying drawings, wherein like characters of reference are used to designate like parts, and wherein:

Figure 1 is a side elevational view of the bale wagon in accordance with the present invention;

Figure 2 is a rear end view thereof on an enlarged scale, partly in section to reveal internal parts;

Figure 3 is a fragmentary plan view of the wagon with the drum omitted to reveal the front and rear portions of the chassis, also showing some of the parts in section;

Figure 4 is a fragmentary plan view of the clutch means used in the invention;

Figure 5 is a fragmentary vertical sectional view of the bale actuated detent at the end of the compartmented drum;

Figure 6 is a fragmentary vertical sectional view of the exterior conveyor means;

Figure 7 is a fragmentary side elevational view of the exterior conveyor means;

Figure 8 is a fragmentary horizontal sectional view of the drive for the exterior conveyor means; and Figure 9 is a fragmentary vertical sectional view of the exterior conveyor drive.

Referring now to the accompanying drawings in detail, the bale wagon in accordance with the present invention is designated generally by the reference numeral 10 and embodies in its construction an elongated chassis 11 having a front end 11a and a rear end 11b and provided intermediate the ends thereof with tandem wheels 12 mounted on suitable axles 13.

A pair of shafts 14 extend longitudinally at opposite sides of the chassis 11, being rotatably journalled in suitable bearings 15, and pairs of rollers 16 are secured to these shafts for supporting a rotatable drum 17.

The drum 17 is provided at the ends thereof with annular members 18 which are supportably engaged by the rollers 16, and the drum also includes a tubular core member 19 and a set of longitudinally extending partitions 20 which separate the interior of the drum into a plurality of circumferentially arranged bale receiving compartments 21. The partitions 20 are substantially V-shaped in cross section and are provided integrally with angulated flanges 20a disposed substantially at the periphery of the drum. The flanges of the adjacent partitions are spaced apart as shown in Figure 2, so that each of the compartments 21 is formed with an elongated opening 22 at the drum periphery. If desired, the partitions 20 may be braced together at the periphery of the drum and intermediate the ends of the drum by suitable straps 23 which, however, do not bridge the spaces or openings 22 so that these spaces or openings remain unobstructed.

Suitable cross members 24, 25 are provided in the chassis 11 near the respective front and rear ends 11a, 11b thereof, whereby to provide bearings for two axially aligned shafts 26, 27, as shown in Figure 3. Two substantially V-shaped yokes 28, 29 are pivotally mounted on the respective shafts 26, 27 for raising and lowering movement, the free ends or apices of these yokes forming bearings 30 for stub shafts at the ends of a screw-type conveyor 31. The yokes 28, 29 also carry transverse shafts 32 having rollers 33 provided thereon, these rollers being receivable in concave depressions 34 formed in the drum members 18, as is shown in Figure 2. Suitable tension springs 35 are connected to the yokes 28, 29 for urging the same upwardly as shown by the arrow 36 in Figure 2, so that the rollers 33 are urged into the recesses or depressions 34.

A portion of the apparatus at the front end of the drum 17 and in alignment with one of the compartments 21 may be referred to as the bale loading and unloading station 37, which is also in longitudinal alignment with the axis of the conveyor 31. The conveyor 31 is disposed in the chassis at the bottom of the drum 17 and the arrangement of parts is such that when the yokes 28, 29 are swung upwardly about the shafts 26, 27, the conveyor 31 is raised and projected through the opening 22 into that compartment of the drum which is in alignment with the loading and unloading station 37. In that position the rollers 33 are seated in the appropriate of the depressions 34, whereby to provide means for indexing the drum in terms of alignment of its respective compartments with the loading and unloading station. When the yokes 28, 29 are swung downwardly, the conveyor 31 is retracted from the drum compartment, whereupon rotation of the drum may be effected.

A suitable motor 38 is mounted on a platform 39 at the front end 11a of the chassis and drives a reversible gear box 40 which, in turn, is connected by a chain or belt drive 41 to the aforementioned shaft 26. A chain drive 42 operatively connects the latter to the conveyor 31, it being noted that, as shown in Figure 4, the sprocket 42a of the chain drive 42 is freely rotatable on the shaft 26 but may be driven by the shaft 26 through the medium of a clutch member 43. The latter is rotatable with but slidable on the shaft 26 and, apart from the sprocket 42a, may also be operatively engaged with a sprocket 44a of another chain drive 44, hereinafter to be further described. Like the sprocket 42a, the sprocket 44a is freely rotatable on the shaft 26 and may be driven thereby only through the medium of the clutch member 43. The sliding of the clutch member on the shaft 26, between the sprockets 42a and 44a is effected by a forked end of a lever 45 which is pivoted at 46 to a stationary frame member 47.

The aforementioned chain drive 44 imparts rotation to a shaft 48 which, in turn, is connected by suitable gearing 49 to a cross shaft 50, the latter being journalled in suitable brackets 51 in the chassis and being connected by gearing 52 to the shafts 14. It will be apparent from the foregoing that rotation of the shaft 48 will be transmitted to the drum supporting rollers 16 which, in turn, will impart rotation to the drum 17, so that the several compartments 21 of the drum are brought successively in alignment with the loading and unloading station 37.

A bale actuated detent 53 is provided substantially in alignment with the conveyor 31 at the rear end 11b of the chassis, the detent being pivoted at 54 to a bracket 55 on the chassis and being adapted to be pressed in the direction of the arrow 56 (in Figure 5) when it is engaged by the end of a bale 57 in the loaded compartment when the compartment is full. The detent 53 is operatively connected by a flexible cable 58 to the lever 45, the cable passing around one or more suitable guide pulleys, as indicated at 59. A branch 58a is secured to an intermediate portion of the cable 58 and, after passing around a guide pulley 69, is connected to the aforementioned yoke 29 as indicated at 61.

Conveyor means are provided for moving bales to and from the loading and unloading station 37, these means comprising a screw-type conveyor 62 disposed at the bottom of a bale delivery trough 63 and a conveyor extension 64 disposed at the bottom of a trough extension 65. The trough extension 65 is hingedly connected at 66 to the trough 63 and the conveyors 62, 64 are operatively connected together by a universal joint 67. It may be noted in this regard that inasmuch as the loading and unloading station 37 is offset laterally from the axis of the drum 17 as shown in Figure 2, and since the bottom of the station is disposed perpendicularly to a radial line from the drum center, the loading and unloading station is slanted laterally from the horizontal. However, the arrangement of the trough 63 and extension 65 is such that the outer or forward end 65a of the extension lies flat on the ground, indicated at 68. Moreover, the provision of the hinged connection 66 and of the universal joint 67 permits the outer end of the trough extension to contact the ground regardless of any differences in height of the chassis as a result of ground irregularities.

The conveyors 62, 64 are driven continuously by a chain drive 69 from the shaft 26 and the conveyor trough 63 is also provided at the top thereof with a pair of laterally spaced conveyor members 70 which are in the form of endless chains, equipped with suitable lugs 71 and passing around sprockets mounted on a pair of shafts 72, 73. The shaft 73 is adapted for raising and lowering movement in a pair of arcuate slots 74 formed in the sides of the trough 63 and the distance of the shaft 73 above the conveyor 62 is such that the shaft is moved upwardly in the slots when a bale comes in contact with the underside of the conveyor members 70, as indicated at 75 in Figure 6.

The shaft 72 is connected by a universal joint 76 to a shaft 77 which, in turn, is connected by a belt or chain drive 78 to a shaft 79, driven by gearing 80 from the conveyor screw 62. The shafts 77, 79 are rotatably journalled in a support member 81 secured to the chassis.

As shown in Figure 7, a lever 82 is pivoted to one side of the trough 63 and has a portion 82a in engagement with the shaft 73 so that movement of the lever may be transmitted to the shaft and vice versa. The lever portion 82 is operatively connected by a flexible cable 83 to the lever 45, the cable 83 passing around suitable guide pulleys 84, 85. In addition, a manually operated flexible cable 86 is connected to the lever 45 as shown in Figure 3, the cable 86 passing around a guide pulley 87 and extending to the front of the machine.

Having thus described the contruction of the invention, its manner of operation will now be explained.

Upon energization of the motor 38, rotation will be imparted to the shaft 26 and through the drive 69 to the external conveyors 62, 64 as well as through the drive 78 to the conveyor members 70. However, with the clutch member 43 disengaged from both the sprockets 42a, 44a, the conveyor 31 will not be driven and the drum 17 will not be rotated.

When a bale is deposited on the conveyor 64, it will be propelled thereby to the conveyor 62 and when the bale reaches the position shown at 75 in Figure 6, it will come in contact with the conveyor members 70 and will raise the shaft 73 in the slots 74. This movement of the shaft 73 will be transmitted by the lever portion 82a and the cable 83 to the lever 45, swinging the latter forwardly to bring the clutch member 43 in engagement with the sprocket 42a so that drive is transmitted from the shaft 26 to the conveyor 31.

After passing through the station 37, the bale will be moved rearwardly in the aligned drum compartment by the conveyor 31, but promptly upon clearing the conveyor members 70, the bale will permit the shaft 73 to drop in the slots 74, thus again interrupting the drive to the conveyor 31. The same action will be repeated with the next bale deposited on the conveyor 64 which will then cause feeding of the previous bale rearwardly in the drum compartment, until the drum compartment is filled and the bale at the rear end of the compartment comes in contact with the detent 53.

The pressing of the detent 53 in the direction of the arrow 56 by the bale will pull the cable 58 and actuate the lever 45 so as to engage the clutch member 43 with the sprocket 44a, thus imparting rotation to the drum 17 through the shafts 50 and 14 to bring the next compartment of the drum in alignment with the station 37. Simultaneously with commencement of rotation of the drum, the rollers 33 will become disengaged or unseated from the depressions 34 and will cause the yokes 28, 29 to be lowered, thus retracting the conveyor 31 from the associated drum compartment so that the conveyor does not interfere with the drum rotation. When the next empty drum compartment is aligned with the station 37, the rollers 33 will again seat themselves in the depression 34 to permit raising of the conveyor 31 to its projected position, but while the yokes 28, 29 are lowered, the cable branch 58a acting on the lever 45, will retain the clutch member 43 in engagement with the sprocket 44a so that rotation of the drum may continue.

The apparatus will then be in readiness for loading of the next drum compartment in a repeated cycle of operation until all the compartments of the drum have been loaded.

The unloading of the wagon is effected by reversing the gear box 40 and actuating the lever 82 so as to raise the shaft 73 which causes the conveyor 31 to rotate in a reverse direction and discharge bales through the station 37 onto the conveyors 62, 64. When one compartment of the drum is thus unloaded, the cable 86 is pulled by the operator to cause engagement of the clutch member 43 with the sprocket 44a and rotate the drum for alignment of the next loaded compartment with the station 37.

While in the foregoing there has been shown and described the preferred embodiment of the invention, various modifications may become apparent to those skilled in the art to which the invention relates. Accordingly, it is not desired to limit the invention to this disclosure, and various modifications may be resorted to, such as may lie within the spirit and scope of the appended claims.

What is claimed as new is:

1. In a self-loading and unloading bale wagon, the combination of a wheeled chassis, an elongated drum rotatably mounted on said chassis, longitudinal partitions provided in said drum and separating the interior thereof into a plurality of circumferentially arranged bale receiving compartments, a bale loading and unloading station provided at one end of said drum in alignment with one of the compartments therein, conveyor means provided on said chassis in alignment with said loading and unloading station for moving bales in and out of the compartment aligned with said station, means for rotating said drum for bringing the respective compartments successively in alignment with said station, said conveyor means on said chassis being projectable in and retractable from the compartments of said drum, and means for projecting and retracting said conveyor means in and from said compartments.

2. In a self-loading and unloading bale wagon, the combination of a wheeled chassis, an elongated drum rotatably mounted on said chassis, longitudinal partitions provided in said drum and separating the interior thereof into a plurality of circumferentially arranged bale receiving compartments each having an elongated opening at the outside of the drum, a bale loading and unloading station provided at one end of said drum in alignment with one of said compartments, an interior conveyor provided on said chassis under the drum in alignment with said loading and unloading station, means for raising and lowering said interior conveyor to respectively project the same into and retract the same out of the elongated opening of the compartment aligned with said station whereby to move bales longitudinally in said compartment, means for rotating said drum for bringing the respective compartments successively in alignment with said station, and an external conveyor disposed exteriorly of said chassis for moving bales to and from said loading and unloading station.

3. The device as defined in claim 2 together with bale actuated means provided on said chassis for controlling said drum rotating means.

4. The device as defined in claim 2 together with means operatively connecting said interior conveyor raising and lowering means to said drum rotating means, whereby the drum may be rotated when the interior conveyor is lowered to its retracted position.

5. The device as defined in claim 2 together with bale actuated means provided on said exterior conveyor for controlling the operation of said interior conveyor.

6. In a self-loading and unloading bale wagon, the combination of a wheeled chassis, a compartmented drum rotatably mounted thereon, a bale loading and unloading station provided at one end of said drum in alignment with one of the compartments therein, an interior conveyor provided on the chassis in alignment with said station for moving bales in and out of the compartment of the drum aligned with said station, means for rotating said drum for bringing the respective compartments thereof in alignment with said station, an exterior conveyor disposed exteriorly of said chassis for moving bales to and from said station, and bale actuated means provided on said exterior conveyor for controlling the operation of said interior conveyor.

References Cited in the file of this patent

UNITED STATES PATENTS

| | | |
|---|---|---|
| 1,908,899 | Kayel | May 16, 1933 |
| 2,761,578 | Brownlee et al. | Sept. 4, 1956 |